United States Patent
Hong et al.

(10) Patent No.: US 10,844,770 B2
(45) Date of Patent: Nov. 24, 2020

(54) COOLING FAN MODULE

(71) Applicant: Brose Fahrzeugteile GmbH & Co. Kommanditgesellschaft, Wuerzburg, Wuerzburg (DE)

(72) Inventors: Tao Hong, Farmington Hills, MI (US); William Brehmer, Farmington Hills, MI (US); Attila Simofi-Ilyes, Clarkston, MI (US); Derek Mudge, Commerce Township, MI (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 50 days.

(21) Appl. No.: 16/208,670

(22) Filed: Dec. 4, 2018

(65) Prior Publication Data

US 2020/0173336 A1 Jun. 4, 2020

(51) Int. Cl.
| | |
|---|---|
| *F04D 29/32* | (2006.01) |
| *F01P 1/06* | (2006.01) |
| *F28F 9/00* | (2006.01) |
| *B60K 11/06* | (2006.01) |
| *F01P 5/02* | (2006.01) |
| *F28D 21/00* | (2006.01) |

(52) U.S. Cl.
CPC ............... *F01P 1/06* (2013.01); *B60K 11/06* (2013.01); *F01P 5/02* (2013.01); *F28F 9/002* (2013.01); *F28D 2021/004* (2013.01); *F28D 2021/0091* (2013.01)

(58) Field of Classification Search
CPC ...... F01P 5/06; F01P 5/02; F01P 11/12; F04D 29/164; F04D 29/326; F04D 19/002; F04D 29/329
USPC .......... 415/208.3, 173; 416/169 A, 189–192
See application file for complete search history.

(56) References Cited

U.S. PATENT DOCUMENTS

| | | | | |
|---|---|---|---|---|
| 5,423,660 A | * | 6/1995 | Sortor .................. | F01P 5/06 416/189 |
| 5,489,186 A | * | 2/1996 | Yapp .................... | F01D 5/141 415/208.3 |
| 6,027,307 A | * | 2/2000 | Cho ...................... | F04D 29/164 415/173.5 |
| 7,789,622 B2 | * | 9/2010 | Acre ..................... | F04D 29/164 415/209.3 |

(Continued)

FOREIGN PATENT DOCUMENTS

WO   WO-2009129093 A2 * 10/2009 ........... F04D 29/164

*Primary Examiner* — George C Jin
*Assistant Examiner* — Teuta B Holbrook
(74) *Attorney, Agent, or Firm* — Brooks Kushman, P.C.

(57) ABSTRACT

A cooling fan module is provided. The cooling fan module may include a frame, a fan assembly, a number of guide vanes, and a cylindrical deflector. The frame may include a sidewall that defines an opening and an outer periphery. The fan assembly may be disposed within the opening and include fan blades extending from a hub and terminating at a fan ring. The fan ring may have a curved profile. The number of guide vanes may be disposed radially around the opening. The cylindrical deflector may extend axially from the sidewall and radially surround the number of guide vanes. The cylindrical deflector may be disposed radially between the number of guide vanes and the outer periphery.

20 Claims, 6 Drawing Sheets

(56) References Cited

U.S. PATENT DOCUMENTS

| | | | | |
|---|---|---|---|---|
| 7,794,204 B2* | 9/2010 | Stevens | ............... | F04D 29/326 |
| | | | | 415/220 |
| 8,454,300 B2* | 6/2013 | Stagg | ................ | F04D 29/164 |
| | | | | 415/58.5 |
| 9,909,485 B2* | 3/2018 | Hong | ..................... | F01P 1/06 |
| 2003/0161728 A1* | 8/2003 | Cho | .................... | F04D 29/164 |
| | | | | 415/222 |
| 2005/0019152 A1* | 1/2005 | Seitz | .................... | F01D 5/145 |
| | | | | 415/58.5 |
| 2007/0224044 A1* | 9/2007 | Hong | ................. | F04D 29/547 |
| | | | | 415/211.2 |
| 2016/0138610 A1* | 5/2016 | Jung | ................. | F04D 29/526 |
| | | | | 415/173.1 |

* cited by examiner

FIG. 3F

COOLING FAN MODULE

TECHNICAL FIELD

The present disclosure relates to a cooling fan module, in particular one for use with a heat exchanger, such as a radiator, for an automotive vehicle. However, the present disclosure can also be used in other applications such as cooling fan for a home heating and cooling system.

BACKGROUND

Vehicles often include various components that are cooled by a heat exchanger, such as a radiator. Heated air may be drawn or moved away from the radiator by a cooling fan module. Cooling fan modules may include a powered fan that is housed within a frame and operable to move drawn air from an upstream side of the frame to a downstream side of the frame. Under certain conditions, air drawn to the downstream side of the frame may recirculate to the upstream side, thus potentially leading to inefficiencies.

SUMMARY

According to one embodiment, a cooling fan module is provided. The cooling fan module may include a frame, a fan assembly, a number of guide vanes, and a cylindrical deflector. The frame may include a sidewall that defines an opening and an outer periphery. The fan assembly may be disposed within the opening and include fan blades extending from a hub and terminating at a fan ring. The fan ring may have a curved profile. The number of guide vanes may be disposed radially around the opening. The cylindrical deflector may extend axially from the sidewall and radially surround the number of guide vanes. The cylindrical deflector may be disposed radially between the number of guide vanes and the outer periphery.

According to another embodiment, a cooling fan module is provided. The cooling fan module may include a frame, a fan assembly, a number of guide vanes, and a sleeve. The frame may include a sidewall that defines an opening and an outer periphery. The opening may define an inner periphery. The inner periphery and the outer periphery may each define an axially extending flange. The fan assembly may be disposed within the opening and include fan blades extending from a hub and terminating at a fan ring. The sleeve may axially extend from a surface of the frame. The number of guide vanes may be arranged circumferentially about the inner periphery and radially inward from the sleeve.

According to yet another embodiment, a cooling fan module is provided. The cooling fan module may include a frame, a fan assembly, a number of guide vanes, and an annular deflector wall. The frame may define an outer periphery and a central opening. The central opening may define an inner periphery. The fan assembly may be disposed within the central opening and include a fan ring having a concave surface that at least partially surrounds the inner periphery. The number of guide vanes may be arranged circumferentially about the inner periphery. The annular deflector wall may extend axially from a surface disposed radially between the outer periphery and the number of guide vanes.

The cooling fan module may also include a planar annular ring. The planar annular ring may be coupled to the annular deflector wall to mitigate noise associated with recirculation of air through the fan assembly. In one or more embodiments, the planar annular ring may increase airflow performance of the cooling fan module.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include one or more cooling fan modules to cool heat-generating components, such as an engine, battery, transmission, radiator, or electric motor. An exemplary cooling fan module is described in U.S. Pat. No. 9,909,485 and is hereby incorporated by reference. Cooling fan modules may include a fan assembly disposed within an opening of the frame. When powered the motor rotates the fan to create an airflow to displace heated air away from the radiator. The side of the cooling fan module disposed closest to the radiator may be referred to as the upstream side and the side disposed further away from the radiator may be referred to as the downstream side.

Pressure downstream from the fan may be higher than pressure on the upstream side of the fan. This pressure difference may drive recirculating airflow from the downstream side back to the upstream side through a space between the fan and the opening defined by the frame. This recirculating airflow may be drawn across the fan blades. As a result, tangential airflow velocity may vary, thus decreasing efficiency and leading to unwanted noise.

In the following discussion of the figures, a polar coordinate system is utilized. An axial direction extends along an axis of rotation the fan assembly. A radial direction extends orthogonal to the axial direction from the axis of rotation towards a periphery of the frame of the cooling fan module.

The term orthogonal means one or more surfaces or lines intersect at a right angle or are arranged at a right angle. The term planar means a surface is flat and lies along a plane.

Figure 1:
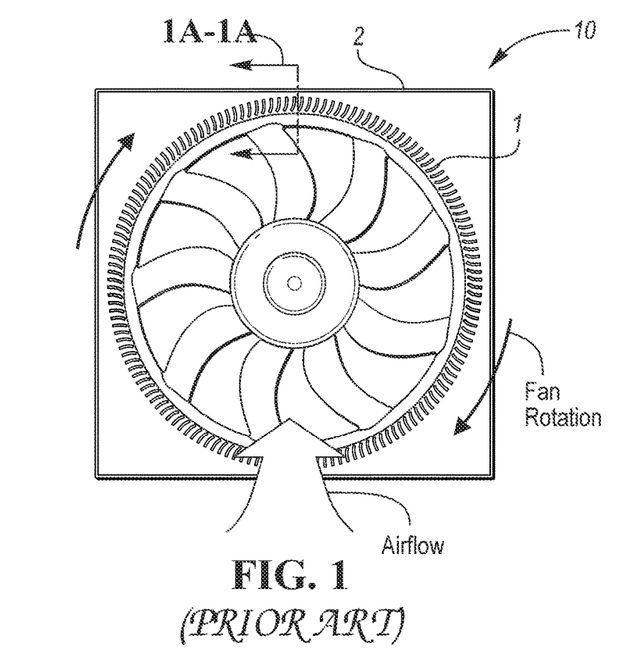
FIG. 1 is a front view of an exemplary prior art cooling fan module.
Figure 1A:
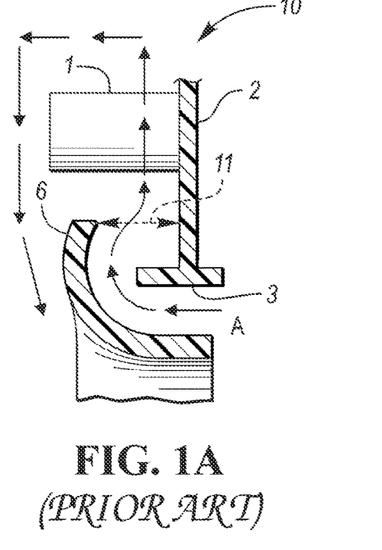
FIG. 1A is a cross-sectional view taken along lines 1A-1A in FIG. 1.

FIG. 1 illustrates a front view of a prior art cooling fan module 10 and FIG. 1A illustrates a cross-section of the same taken along the lines 1A-1A. The prior art cooling fan module 10 includes a fan assembly that includes fan blades that are connected to one another by a fan ring 6. The prior art cooling fan module 10 may include a frame 2 that includes a wall 2 that is spaced apart from the fan ring 6 by an axial distance 11. A number of guide vanes 1 are connected to the wall 2 and circumferentially surround the fan ring 6. The guide vanes 1 are configured to alter the direction of the airflow so that it is displaced radially outward.

Figure 1B:
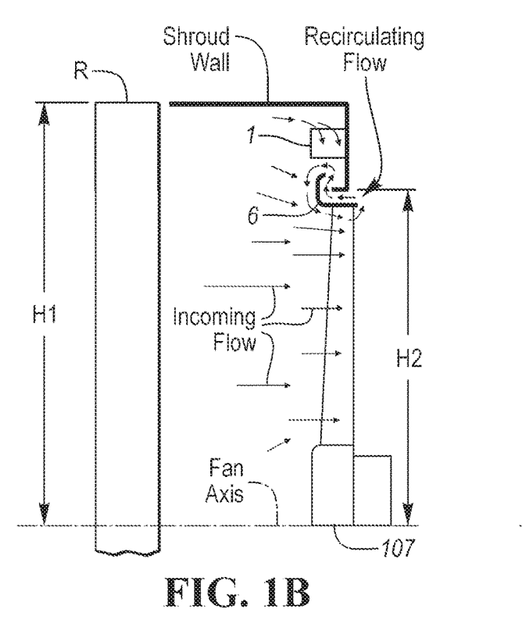
FIG. 1B is a side view illustrating airflow between a radiator and the prior art cooling fan module.
Figure 1C:
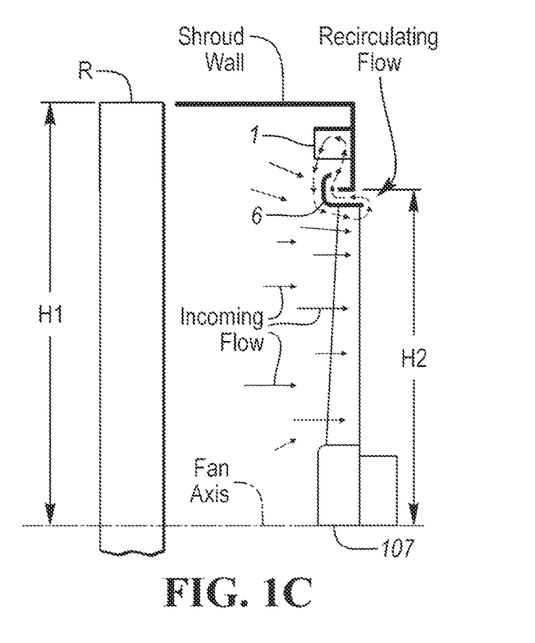
FIG. 1C is a side view illustrating airflow between a radiator and an exemplary cooling fan module.

Referring to FIG. 1B and FIG. 1C, side views illustrating airflow between a radiator R and the prior art cooling fan module 10. The radiator R or other heat generating component may define a height $H_1$ and the cooling fan module 10 may define a height $H_2$ that is less than the height $H_1$ of the radiator R. Because of the difference in height, airflow A from upper and lower portions of the radiator R may be drawn towards the cooling fan module 10. The airflow from the upper portion of the radiator R is drawn in a downward direction and the airflow from the lower portion of the radiator R is drawn in an upward direction. The airflow from the upper and lower portions of the radiator R may counteract or disrupt the radial or vertical component of the airflow passing through the guiding vanes 1. When the radial or vertical airflow through the guide vanes 1 is counteracted or disrupted, the airflow may recirculate. The recirculating air may lead to a decrease in efficiency and unwanted to noise.

Figure 1D:
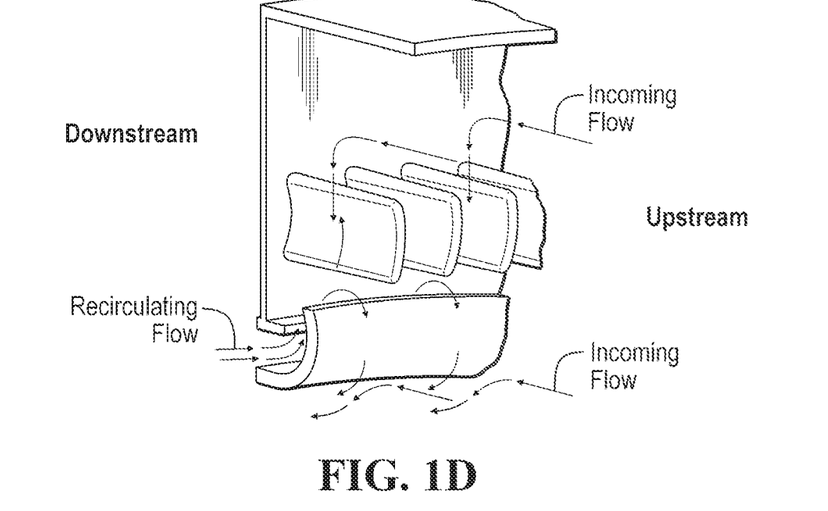
FIG. 1D is a partial angled cross-sectional view taken along 1A-1A in FIG. 1 of the prior art cooling fan module.

FIG. 1D illustrates an angled cross-sectional view of a portion of the prior art cooling fan module 1 and the airflow from the fan and the radiator R. The airflow from the fan is represented by the arrows that move along the cooling fan ring in the bottom left portion of the figure. This airflow moves radially along the guide vanes 2 until it reaches a top portion of the frame. The airflow may be diverted in an axial direction away from the downstream side of the frame. The airflow from the upper and lower portions of the radiator R may be referred to as incoming airflow and is represented by the arrows that are directed towards the downstream side of the cooling fan module 1 above the guide vanes. The incoming airflow from the outer periphery of the radiator may counteract or disrupt the radial or vertical component of the airflow passing through the guiding vanes, leading a portion of the recirculating airflow to bypass the guiding vanes and directly go into fan blade. The recirculating airflow may reduce the efficiency of the cooling fan module. To mitigate the above-mentioned problems, a cylindrical deflector, or planar annular ring, or both may be implemented.

Figure 2:
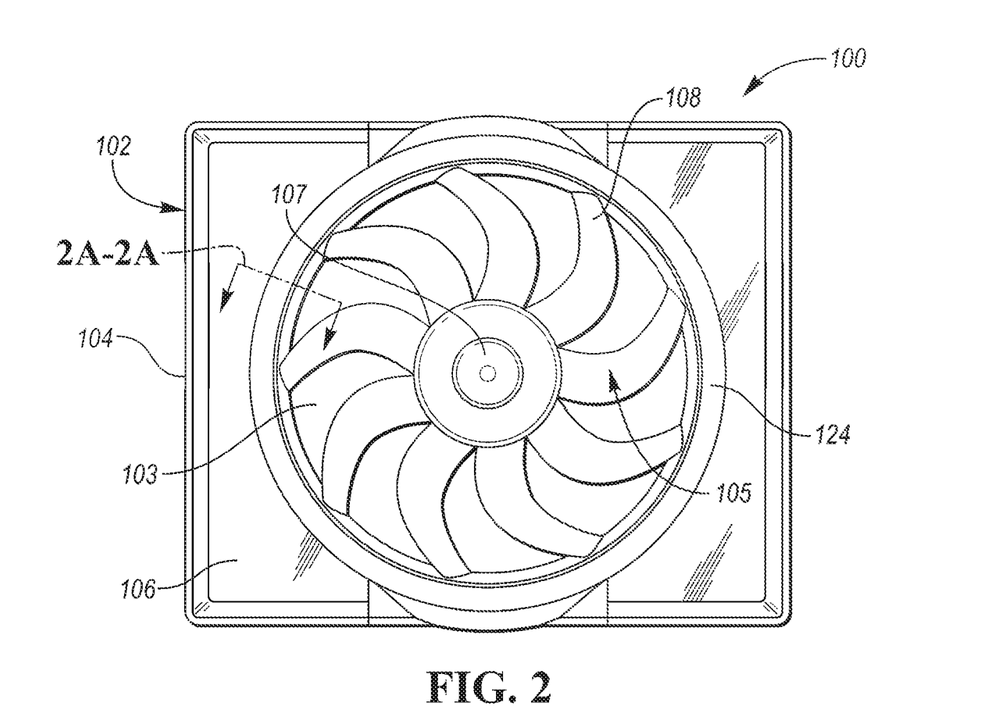
FIG. 2 is a front view of an exemplary cooling fan module according to one embodiment.
Figure 2A:
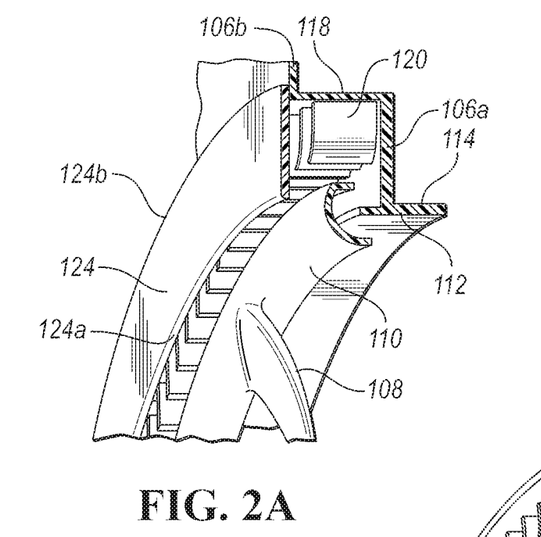
FIG. 2A is an isometric cross-sectional view taken along the lines 2A-2A in FIG. 2.
Figure 2B:
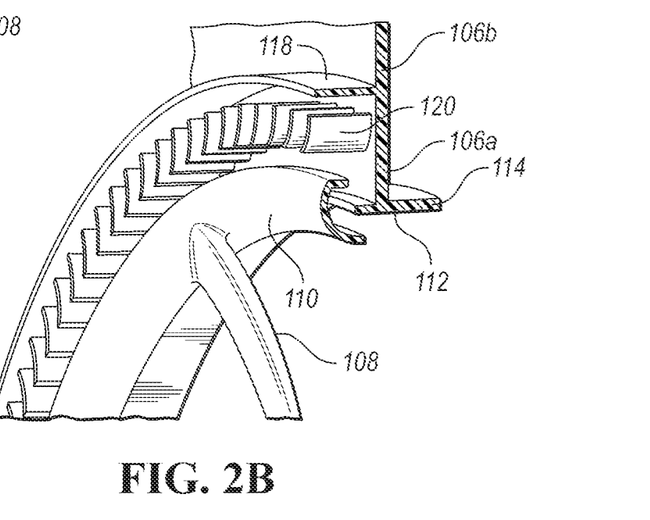
FIG. 2B is an isometric cross-sectional view of another exemplary cooling fan module taken along the lines 2A-2A in FIG. 2.
Figure 2C:
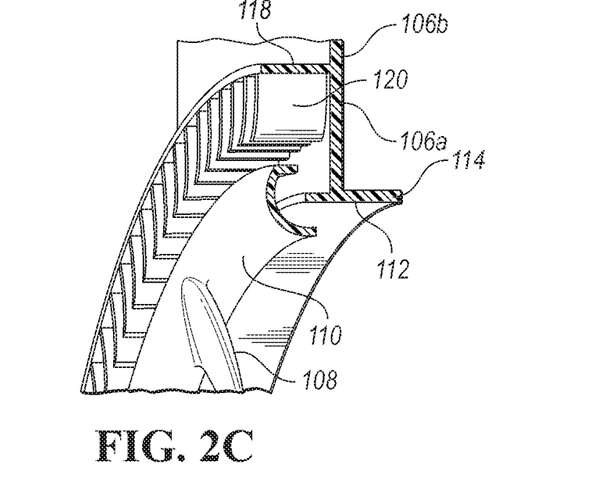
FIG. 2C is an isometric cross-sectional view of another exemplary cooling fan module taken along the lines 2A-2A in FIG. 2.
Figure 3A:
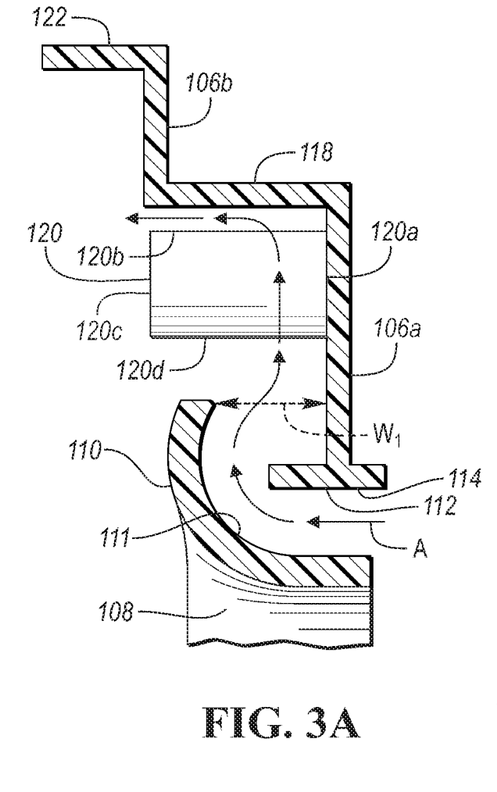
FIGS. 3A-3F are cross-sectional views of exemplary cooling fan modules.
Figure 3B:
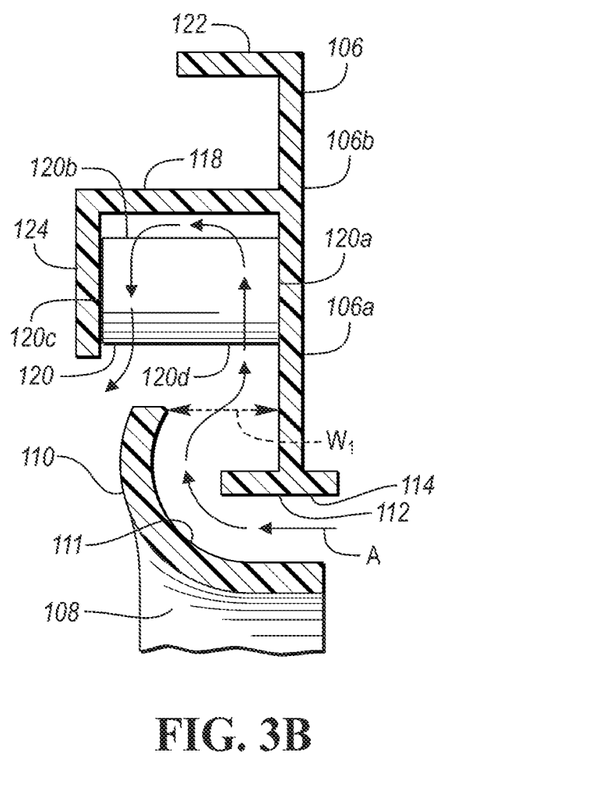
Figure 3C:
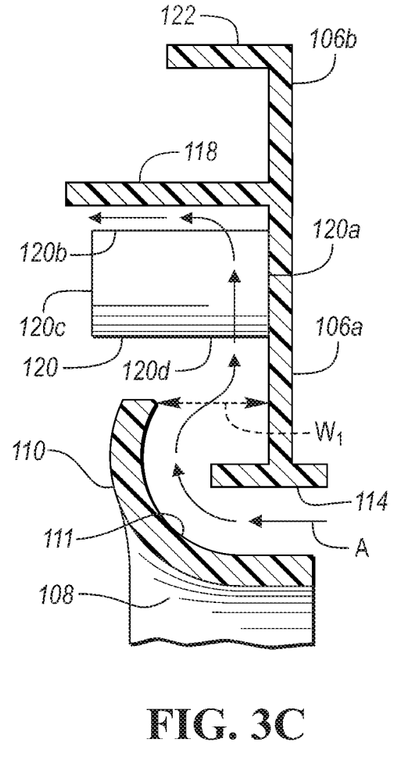
Figure 3D:
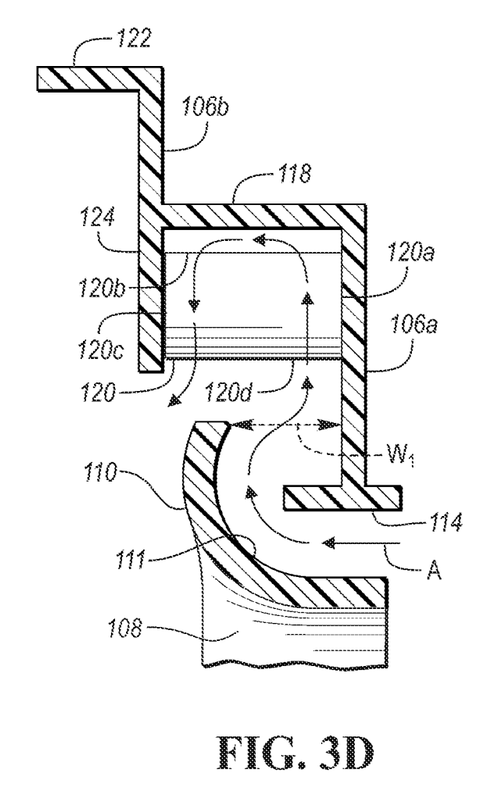
Figure 3E:
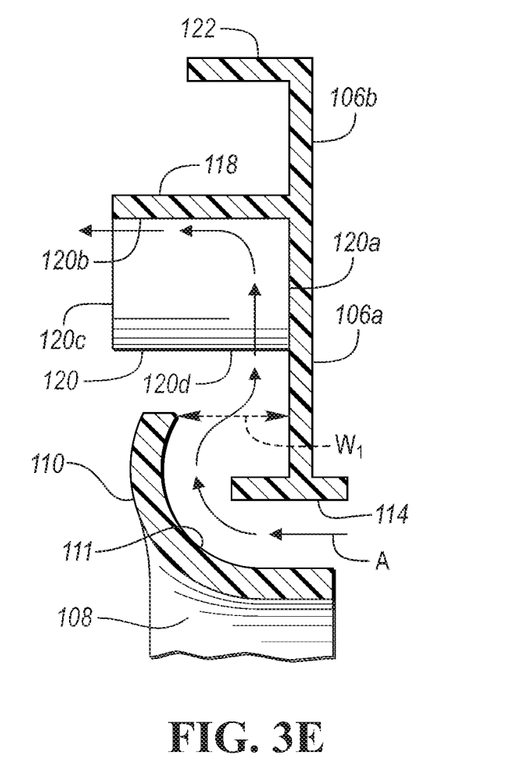
Figure 3F:
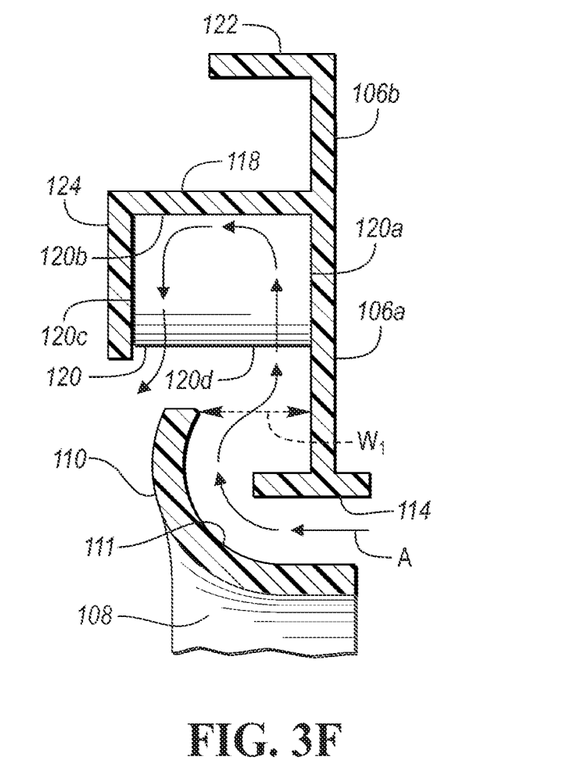

Referring to FIG. 2 through FIG. 3F, a cooling fan module 100 is provided according to one or more embodiments. The cooling fan module 100 may include a frame 102 that defines an opening 103 that may be centrally located with respect to an outer periphery 104 of the frame 102. The cooling fan module 100 may include a fan assembly 105, including a motor supported by stator arms, that may be disposed within the opening 103. The fan assembly may include fan blades 108 that outwardly extend from a hub 107 and terminate at a fan ring 110. The fan ring 110 may define a curved profile that defines a concave surface 111. The concave surface 111 may at least partially surround an inner periphery 112 of the opening 103.

The cooling fan module 100 may include a number of guide vanes 120 that are arranged circumferentially about the inner periphery 112 of the opening 103. In one or more embodiments, one or more of the guide vanes 120 may be connected to or integrally formed with a sidewall 106 defined by the frame 102. An annular deflector wall 118 may axially extend from a surface, such as a surface defined by the sidewall 106. The annular deflector wall 118 may be referred to as a sleeve or a cylindrical deflector. The annular deflector wall 118 may be disposed radially between the outer periphery 104 and the guide vanes 120. One or more of the guide vanes 120 may be connected to or integrally formed with the annual deflector wall 118.

In one or more embodiments, the cooling fan module 100 may also include a planar annular ring 124 that may be coupled to the annular deflector wall 118. Alternatively, the annular ring may be coupled (e.g., directly or indirectly) to a portion of the frame 102. In one or more embodiments, the term coupled may mean the planar annular ring 124 may be fixed to or connected to the annular deflector wall or frame 102 by one or more fasteners, adhesive, or a mechanical connection (e.g., snap fit, interference fit). In one or more embodiments, the planar annular ring 124 may arranged orthogonally with respect to the annular deflector wall 118, or the sidewall 106 of the frame 102, or both. The planar annular ring 124 may define an inner periphery 124a and an outer periphery 124b.

As stated above, the frame 102 includes a sidewall 106 that defines the opening 103. The sidewall 106 may include one or more sections, such as a first section 106a and a second section 106b. In one or more embodiments, the first section 106a may be disposed radially inward from the second section 106b. As one example, the first section 106a may be disposed between the inner periphery 112 and the annular deflector wall 118 and the second section 106b may be disposed between the outer periphery 104 and the annular deflector wall 118. In one or more embodiments, the first section 106a and the second section 106b may be axially offset from one another.

When installed in a vehicle, the cooling fan module 100 may be positioned adjacent to a vehicle heat exchanger, such as a radiator or condenser. The cooling fan module 100 may be configured to draw heated air away from the radiator. The side of the cooling fan module 100 disposed closest to the radiator may be referred to as the upstream side and the side disposed further away from the radiator may be referred to as the downstream side. In one or more embodiments, the concave surface 111 of the fan ring 110 may be curved towards the downstream side. The inner periphery 112 and the outer periphery 104 frame 102 may each include a flange 112, 122. In one or more embodiments, the flange 122 of the outer periphery, or the flange 112 of the inner periphery, or both may extend from the sidewalls 106 in an axial direction. Each of the flanges may have a T-shaped cross-section.

FIG. 2 illustrates a plan view of a cooling fan module 100 according to one or more embodiments. FIG. 2A, FIG. 2B, and FIG. 2C each illustrate cross-sectional views of different embodiments taken along the line 2A-2A.

FIG. 2A illustrates the cooling fan module 100 that includes the planar annular ring 124. The planar annular ring 124 is coupled to the first section 106*a* of the side wall 106 and the annular deflector wall 118. The guide vanes 120 may have a curved profile that are coupled to or extend from the annular deflector wall. The guide vanes 120 may also extend from or be coupled to the first section 106*a* of the sidewall 106. The second section 106*b* of the sidewall is axially offset from the from the first section 106*a* towards the upstream side of the cooling fan module 100.

FIG. 2B illustrates the cooling fan module 100 without the planar annular ring 124. In this embodiment, the guide vanes 120 are radially spaced apart from the annular deflector wall 118 and extend from the first section 106*a*. The first section 106*a* and the second section 106*b* may are radially aligned with one another.

FIG. 2C illustrates the cooling fan module 100 without the planar annular ring 124. In this embodiment, the guide vanes 120 are coupled to the annular deflector wall 118.

FIG. 3A through FIG. 3F each illustrate cross-sectional views of different embodiments taken along the line 2A-2A.

In FIG. 3A, the outer periphery 104 of the frame 102 includes the flange 122. The flange 122 may extend in an axial direction away from second section 106*b* of the sidewall 106. The second section 106*b* may be axially offset from the first section 106*a*. Also, the first section 106*a* and the second section 106*b* may be connected by the annular deflector wall 118. The inner periphery 112 of the frame 102 may include a T-shaped flange 114 that extends in the axial direction from the first section 106*a*.

In FIG. 3B, the flange 122 extends from the second section 106*b* of the sidewall 106 that is radially in line with the first section 106*a* of the sidewall. In one or more embodiments, the planar annular ring 124 may be integrally formed to the annular deflector wall 118. These components may be formed by an injection molding process or another suitable process.

In FIG. 3C, the annular deflector wall 118 extends in the axial direction and is longer than a length defined by the guide vane 120. The length of the guide vane 120 may be defined by the side 120*d* or 120*b*. In one or more embodiments, the guide vane 120 is radially spaced apart from the annular deflector wall.

In FIG. 3D, the second section 106*b* of the sidewalls 106 is radially in line with the planar annular ring 124. The guide vane 120 may be coupled to or integrally formed with the planar annular ring 124. Also, the guide vane 120 may be radially spaced apart from the annular deflector wall 118.

In FIG. 3E, the annular deflector wall 118 extends in the axial direction and is the same length as the guide vane 120. In one or more embodiments, the guide vanes 120 may be coupled to or integrally formed with the annular deflector wall 118.

In FIG. 3F, the annular deflector wall 118 is coupled to or integrally formed with the planar annular ring 124. The second section 106*b* may be in line with the first section 106*a* of the sidewall 106.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A cooling fan module comprising:
    a frame including a sidewall extending in a radial direction and defining an opening, and an outer peripheral wall;
    a fan assembly disposed within the opening and including fan blades extending from a hub and terminating at a fan ring, having a curved profile;
    a number of guide vanes disposed radially around the opening;
    a cylindrical deflector wall extending axially from the sidewall, radially surrounding the number of the guide vanes, and disposed radially between the number of guide vanes and the outer peripheral wall; and
    a planar annular ring, wherein each of the guide vanes of the number of guide vanes are disposed between the planar annular ring and the sidewall.

2. The cooling fan module of claim 1, wherein each of the guide vanes extend from the sidewall and are radially spaced apart from the cylindrical deflector wall.

3. The cooling fan module of claim 1, wherein each of the guide vanes extend from the cylindrical deflector wall.

4. The cooling fan module of claim 1, wherein the planar annular ring is connected to the cylindrical deflector wall.

5. The cooling fan module of claim 4, wherein each of the guide vanes terminate, in an axial direction, at the planar annular ring.

6. The cooling fan module of claim 1, wherein the opening defines an inner periphery and wherein a cross-section of inner periphery of the opening and a portion of the sidewall is T-shaped or L-shaped.

7. The cooling fan module of claim 1, wherein the curved profile of the fan ring is arranged towards a downstream side of the frame and wherein the outer periphery of the frame includes a flange that extends axially away from the downstream side of the frame.

8. A cooling fan module comprising:
    a frame including a sidewall defining an outer periphery and a central opening that defines an inner periphery, wherein the outer periphery and the inner periphery each define an axially extending flange, the sidewall includes a first section and a second section disposed radially inward and radially aligned with respect to the first section, and the central opening is radially aligned with the sidewall;
    a fan assembly disposed within the opening and including fan blades that terminate at a fan ring that at least partially overlaps the inner periphery in a radial direction;
    a cylindrical sleeve axially extending from a surface of the sidewall and disposed between the first and second sections; and a number of guide vanes arranged circumferentially about the inner periphery and radially inward from the sleeve.

9. The cooling fan module of claim 8, further comprising a planar annular ring wherein the planar annular ring is connected to and arranged orthogonal to the sleeve.

10. The cooling fan module of claim 9, wherein the sleeve defines a first axial length and wherein each of the guide vanes define a second axial length that is less than or equal to the first axial length.

11. The cooling fan module of claim 10, wherein the frame includes a sidewall that defines the surface and wherein each of the guide vanes are connected to the sleeve and the sidewall.

12. The cooling fan module of claim 11, wherein the number of guide vanes, sleeve, and sidewall are integrally formed together by injection molding.

13. A cooling fan module for comprising:
- a frame defining an outer periphery, wherein the frame further defines a central opening that defines an inner periphery;
- a fan assembly disposed within the central opening and including a fan ring, wherein the fan ring includes a concave surface that at least partially surrounds the inner periphery;
- a number of guide vanes arranged circumferentially about the inner periphery;
- an annular deflector wall extending axially from a surface disposed radially between the outer periphery and the number of guide vanes; and
- a planar annular ring wherein the planar annular ring is coupled to the annular deflector wall and configured to mitigate noise associated with recirculation of air through the fan assembly.

14. The cooling fan module of claim 13, wherein at least one of the guide vanes is connected to the annular deflector wall.

15. The cooling fan module of claim 13, wherein the planar annular ring is coupled to and arranged orthogonal to the annular deflector.

16. The cooling fan module of claim 15, wherein the planar annular ring defines an inner periphery and wherein the inner periphery of the planar annular ring is disposed radially inward from an inner edge defined by one of the guide vanes.

17. The cooling fan module of claim 15, wherein at least one of the guide vanes is connected to the planar annular ring.

18. The cooling fan module of claim 13, wherein the surface is defined by a sidewall of the frame, wherein the sidewall of the frame includes a first section and a second section, wherein the first section is disposed between the inner periphery and the annular deflector wall and the second section is disposed between each disposed between the annular deflector wall and the outer periphery and wherein the first and second sections of the sidewall are axially offset from one another.

19. The cooling fan module of claim 18, wherein the inner periphery includes a flange that extends axially from the first section of the sidewall.

20. The cooling fan module of claim 18, wherein the outer periphery includes a flange that extends axially from the second section of the sidewall.

* * * * *

UNITED STATES PATENT AND TRADEMARK OFFICE
CERTIFICATE OF CORRECTION

PATENT NO. : 10,844,770 B2
APPLICATION NO. : 16/208670
DATED : November 24, 2020
INVENTOR(S) : Tao Hong et al.

It is certified that error appears in the above-identified patent and that said Letters Patent is hereby corrected as shown below:

In the Claims

Column 8, Line 21, Claim 18:
After "and the second section is disposed"
Delete "between each disposed"

Signed and Sealed this
Twenty-fourth Day of May, 2022

Katherine Kelly Vidal
*Director of the United States Patent and Trademark Office*